(12) United States Patent
Shah

(10) Patent No.: US 9,015,299 B1
(45) Date of Patent: Apr. 21, 2015

(54) LINK GROUPING FOR ROUTE OPTIMIZATION

(75) Inventor: Pritam Shah, Brookline, MA (US)

(73) Assignee: Cisco Technology, Inc., San Jose, CA (US)

( * ) Notice: Subject to any disclaimer, the term of this patent is extended or adjusted under 35 U.S.C. 154(b) by 2095 days.

(21) Appl. No.: 11/336,734

(22) Filed: Jan. 20, 2006

(51) Int. Cl.
| | |
|---|---|
| G06F 15/173 | (2006.01) |
| H04L 29/06 | (2006.01) |
| G01R 31/08 | (2006.01) |
| G08C 15/00 | (2006.01) |
| H04J 1/16 | (2006.01) |
| H04L 12/26 | (2006.01) |

(52) U.S. Cl.
CPC ..................... H04L 29/06 (2013.01)

(58) Field of Classification Search
USPC ........................... 709/223–225; 370/238, 351
See application file for complete search history.

(56) References Cited

U.S. PATENT DOCUMENTS

| | | | |
|---|---|---|---|
| 6,298,061 B1 | 10/2001 | Chin et al. | |
| 6,898,183 B1 * | 5/2005 | Garakani ...................... | 370/238 |
| 6,934,293 B1 | 8/2005 | DeJager | |
| 7,133,928 B2 * | 11/2006 | McCanne ..................... | 709/238 |
| 7,269,157 B2 * | 9/2007 | Klinker et al. ................ | 370/351 |
| 7,274,658 B2 * | 9/2007 | Bornstein et al. ............. | 370/227 |
| 2001/0013066 A1 * | 8/2001 | Erb et al. ....................... | 709/228 |
| 2006/0209719 A1 * | 9/2006 | Previdi et al. ................. | 370/254 |
| 2006/0215558 A1 * | 9/2006 | Chow ............................ | 370/232 |
| 2006/0239199 A1 * | 10/2006 | Blair et al. .................... | 370/248 |

FOREIGN PATENT DOCUMENTS

| | | | |
|---|---|---|---|
| EP | 496061 A2 * | 7/1992 | |
| JP | 2003198621 A * | 7/2003 | |

OTHER PUBLICATIONS

Mimoune—F, Nait—Abdesselam—F, Taleb—T, Hashimoto—K.; Route optimization for large scale network mobility assisted by BGP;2007;DataStar.*
Nait-Abdesselam;Route optimization for large scale network mobility assisted by BGP.;2007;20070000.;4659-63.*
Perlman, Radia, Interconnections Second Edition: Bridges, Routers, Switches, and Internetworking Protocols, Section 12.1-12.3, Addison Wesley, 2000, pp. 299-317.
Rekhter, Y., RFC 1771, entitled A Border Gateway Protocol 4 (BGP-4), Mar. 1995, pp. 1-28.

(Continued)

*Primary Examiner* — Evans Desrosiers
(74) *Attorney, Agent, or Firm* — Novak Druce Connolly Bove + Quigg LLP

(57) ABSTRACT

A technique manages route optimization for one or more groups of links in a computer network. According to the novel technique, each group or "subgroup" of links comprises one or more links, wherein the group may be configured based on various measures, such as, e.g., connectivity (physical or virtual), policies to be applied, per-prefix, per-application (e.g., Internet traffic or voice over IP, VoIP), geographic location, and/or quality-based (e.g., primary links and secondary/backup links). One or more policies may be defined for the groups of links (i.e., where these group policies are to be applied to the group as a whole), in addition to policies that may be defined for individual to links and/or prefixes. Once the link groups are established, traffic over the groups of links (e.g., routes to reachable address prefixes) may be managed and optimized according to the group policies, such as in accordance with Optimized Edge Routing (OER) techniques.

26 Claims, 4 Drawing Sheets

(56) References Cited

OTHER PUBLICATIONS

"NetFlow Services Solutions Guide", Oct. 2004, pp. 1-72, Cisco Systems, Inc.
"NetFlow v9 Export Format", Cisco IOS Release, 2003, pp. 1-22, Cisco Systems, Inc.
U.S. Appl. No. 10/980,550, filed Nov. 3, 2004, entitled Method and Apparatus for Automatically Optimizing Routing Operations at the Edge of a Network, by Shah et al.
Sklower, et al., RFC 1717, entitled The PPP Multilink Protocol (MP), Nov. 1994, pp. 1-20.
U.S. Appl. No. 11/113,629, filed Apr. 25, 2005, entitled Active Probe Path Management, by Blair et al.
U.S. Appl. No. 11/113,582, filed Apr. 25, 2005, entitled Active Probe Target Management, by Metzger, et al.
United States Patent Application No., filed Jan. 20, 2006, entitled Route Optimization of Services Provided by One or More Service Providers for Combined Links, by Shah et al.

\* cited by examiner

TABLE 300

| GROUP ID 305 | LINKS 310 | POLICIES/DEFINITION 315 |
|---|---|---|
| A | 1,2,5 | VoIP |
| B | 3,4,6 | DATA; BACKUP VoIP |
| C | 1,2 | SERVICE PROVIDER 1 |
| D | 3,4 | SERVICE PROVIDER 2 |
| E | 5,6 | SERVICE PROVIDER 3 |
| ⋮ | ⋮ | ⋮ |

ENTRIES 320

FIG. 3

LINK GROUPING FOR ROUTE OPTIMIZATION

CROSS-REFERENCE TO RELATED APPLICATION

The present application is related to commonly-owned copending U.S. patent application Ser. No. 11/336,584, entitled ROUTE OPTIMIZATION OF SERVICES PROVIDED BY ONE OR MORE SERVICE PROVIDERS FOR COMBINED LINKS, filed by Shah et al. on Jan. 20, 2006, the contents of which are hereby incorporated in its entirety.

BACKGROUND OF THE INVENTION

1. Field of the Invention

The present invention relates to computer networks and more particularly to the management of links in a computer network.

2. Background Information

A computer network is a geographically distributed collection of nodes interconnected by communication links and segments for transporting data between end nodes, is such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world; providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node or border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and network-topology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, the monetary cost per amount of bandwidth, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled A Border Gateway Protocol 4 (BGP-4), published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. To implement the BGP protocol, each AS includes at least one border node through which it communicates with other, interconnected ASes. Because data packets enter and exit the AS through the border node, the border node is said to be located at the "edge" of the AS.

The BGP protocol generally facilitates policy-based routing in which an administrative entity places restrictions on inter-AS routing operations. For example, the administrator of a company's AS may employ a BGP routing policy where network traffic leaving the AS is not permitted to enter a competitor's network, even if the competitor provides an otherwise acceptable routing path. BGP policies typically do not depend on the cost-based or distance-based routing metrics used with interior gateway protocols. Instead, the BGP policies rely on AS path-vector information. More specifically, the BGP protocol enables a plurality of interconnected ASes to exchange network topology information. Using this topology information, each AS can derive "paths" to the other reachable ASes, each path defining a logical sequence of ASes. For example, a path between an AS1 and an AS3 may be represented by the sequence {AS1, AS2, AS3} when only AS2 intervenes. Based on the content of these AS sequences, the BGP protocol may filter those paths that do not coincide with the administrator's policies. As such, inter-AS routing operations are performed using only the "best paths" that satisfy the BGP policies.

Because BGP policies are applied to sequences of ASes, the policies are not able to optimize inter-AS routing in other respects, such as optimizing bandwidth utilization or minimizing cost or distance metrics. Furthermore, interior gateway protocols cannot remedy these deficiencies in the BGP protocol because they do not scale well when applied to a large number of network nodes spanning multiple ASes. For instance, the process of exchanging cost-based or distance-based routing metrics among a large number of network nodes would not only consume an unreasonable amount of network bandwidth, but also would consume an unacceptable amount of processing resources for processing those metrics to generate a convergent view of the network topology.

To address the limitations of conventional routing protocols, network administrators sometimes implement additional optimizations to improve network performance. For example, a load-balancing or cost-minimizing procedure may be used in conjunction with traditional routing protocols to redistribute data flows entering or exiting a multi-homed routing domain or AS. In some networks, border nodes located at edges of ASes, e.g., between an enterprise network and one or more Internet Service Providers (ISPs), may be configured as Optimized Edge Routers (OERs). Here each OER may be configured to periodically select an Optimal Exit Link (OEL) to each ISP for a given destination prefix (a monitored prefix) based on performance, load, cost, and service level agreements (SLAB) associated with connections to the ISP. Ultimately, the end result for the enterprise network is improved Internet performance, better load distribution, and/or lower costs for Internet connections. These additional procedures may require the border nodes (OERs) to collect various network statistics associated with the data flows. An exemplary software application that may be used to collect the network statistics at the border nodes is NetFlow™ by Cisco Systems, Incorporated, which is described in more detail in the technical paper entitled *Netflow Services Solutions Guide*, published September 2002, and is hereby incorporated by reference as though fully set forth herein.

Techniques that may be used to select the OEL for the monitored prefix include passive monitoring and/or active probing. Passive monitoring relies on gathering information from OERs learned from monitoring conventional user traffic, such as throughput, timing, latency, packet loss, reachability, etc. For example, selected interfaces at one or more network nodes monitor incoming and outgoing data flows and collect various statistics for the monitored flows. Notably, interfaces may include physical interfaces, such as a port on a network interface card, and/or logical interfaces, such as virtual private networks (VPN) implemented over multiple physical interfaces. Each node stores address prefixes and statistics for the monitored data flows, which may be periodically exported to a central management node (e.g., a "collector" or "Master"). The central management node is configured to receive prefixes and statistics from a plurality of different network nodes. A record format that may be used to export the raw prefixes and statistics is described in the technical paper entitled *Netflow v9 Export Format*, which is hereby incorporated by reference in its entirety. Further, a more sophisticated interaction (e.g., a filtered and/or pre-processed information exchange) between border nodes and a Master node is described in commonly-owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety.

Active probing, on the other hand, relies on probe packets to measure various parameters associated with accessing the monitored prefix from an originating node (source). Here, the originating node may generate multiple probe packets that are then forwarded via different exit interfaces (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links.

Once the relevant statistics are obtained (e.g., at the central management node), the collected parametric (performance) information (i.e., learned from passive monitoring or active probing) is analyzed, such as either manually by a network administrator or dynamically by a software script. The analyzed information may then be used to select an OEL from among the different exits that may be used to reach the destination prefix, and/or to determine whether the data flows may be more optimally distributed. For instance, suppose an administrator desires to make more efficient use of available network bandwidth and determines that a first network interface ("link") is under-utilized and a second interface is over-subscribed. In this case, at least some data flows at the second interface may be redirected to the first interface. To effectuate such a routing change, the administrator may, for example, make static changes to the routing tables at the first and second interfaces or may re-assign local-preference values (or other priority values) associated with the data flows.

The selection of an OEL or best path (e.g., for a particular prefix) is generally based on one or more policies. As defined herein, a policy is any defined rule that determines the use of resources within the network. A policy may be based on a user, a device, a subnetwork, a network, or an application. For example, a router may be configured with a policy defined to route traffic destined for a particular prefix over a best path having the shortest hop count to the prefix. Alternatively, the policy may be defined to route traffic from a type of application over a best path based on the shortest delay or round trip time (RTT). Those skilled in the art will understand that other policies may be defined, such as, e.g., reachability, lowest packet loss, best mean opinion score (MOS), which provides a numerical measure of the quality of human speech at the destination end of the circuit (e.g., for Voice over IP, or VoIP), bandwidth, utilization, cost, etc.

In addition, policies may also be used to define acceptable limits or boundaries on various performance characteristics for, e.g., a particular prefix, a physical or virtual link, etc. For example, a policy may be defined where no more than 100 kilobytes per second (KBps) may traverse a single link to a particular prefix. In this case, when 100 KBps is reached and/or exceeded over a link, various techniques as understood by those skilled in the art (e.g., packet dropping, load balancing, etc.) may be used to reduce the traffic over the out-of-policy (OOP) link in order to bring it back within the limits of the policy (i.e., so the link is "in-policy").

Often, users organize links as a group for a variety of reasons known to those skilled in the art. For example, link groups may be used for increasing the available bandwidth between two points in the network, e.g., by combining multiple smaller/slower links into a single group of links that produces a greater bandwidth value than the smaller/slower links individually. Various forms of grouped links include link bonding/aggregation, EtherChannel, multilink point-to-point protocol (PPP), which is described in RFC 1717, entitled *The PPP Multilink Protocol (MP)*, published November 1994, etc. Other examples of link groups that will be understood by those skilled in the art include multiple VPN tunnels that are created between an enterprise network and a remote office, multiple links that share a common cost structure (e.g., as in an SLA), multiple links that are used in a common load-balancing scheme, etc.

Currently, however, routing policies and route optimization techniques (e.g., OER) operate on individual links and not groups of links. As a result, conventional single-link techniques are often cumbersome when applied to groups of links, and limited control is available to users desiring greater ability to manage and optimize groups of links for a variety of purposes, in addition to those mentioned above. There remains a need, therefore, for a technique that manages route optimization for groups of links in a computer network.

SUMMARY OF THE INVENTION

The present invention is directed to a technique for managing route optimization for one or more groups of links in a computer network. According to the novel technique, each group or "subgroup" of links comprises one or more links, wherein the group may be configured based on various measures, such as, e.g., connectivity (physical or virtual), policies to be applied, per-prefix, per-application (e.g., Internet traffic or voice over IP, VoIP), geographic location, and/or quality-based (e.g., primary links and secondary/backup links). One or more policies may be defined for the groups of links (i.e., where these group policies are to be applied to the group as a whole), in addition to policies that may be defined for individual links and/or prefixes. Once the link groups are established, traffic over the groups of links (e.g., routes to reachable address prefixes) may be managed and optimized according to the group policies, such as in accordance with Optimized Edge Routing (OER) techniques.

Advantageously, the novel technique manages route optimization for groups of links in a computer network by treating each group as if it were a single unit having a single set of policies. As a result, the novel technique enhances the control of routes and the flow of traffic (i.e., link group policies) over conventional and cumbersome single-link techniques.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3 is an exemplary table that may be used in accordance with the present invention.

DETAILED DESCRIPTION OF AN ILLUSTRATIVE EMBODIMENT

Figure 1:
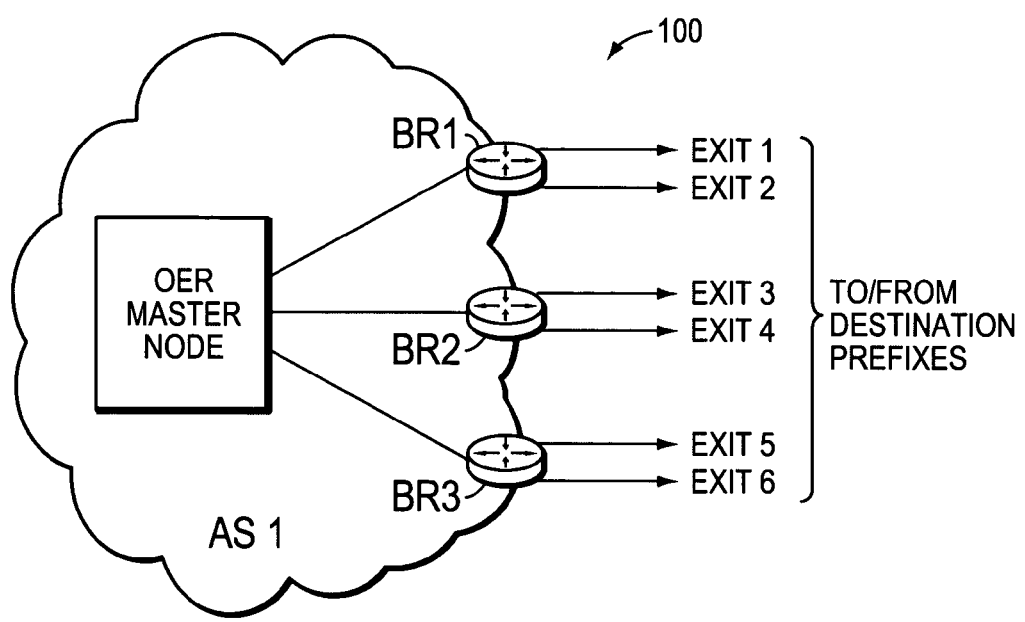
FIG. 1 is a schematic block diagram of an exemplary computer network that may be advantageously used with the present invention.

FIG. 1 is a schematic block diagram of an exemplary computer network 100 comprising an autonomous system (AS) AS1 (e.g., an enterprise or content provider network) interconnected to one or more destination prefixes (e.g., within one or more content consumer networks). Although AS1 is illustratively an autonomous system, those skilled in the art will appreciate that AS1 may be configured as one or more routing domains or other networks or subnetworks. AS1 comprises one or more network nodes, including a set of communicating border nodes (illustratively, edge or border routers, BRs) BR1, BR2, and BR3, through which client communications, such as data packet traffic, can pass into and out of the AS. For example, BR1-BR3 permit communication from AS1 to/from destination prefixes (e.g., via a wide area network, or WAN), such as through illustrative exits 1 and 2 on BR1, exits 3 and 4 on BR2, and exits 5 and 6 on BR3. Routing operations at the border nodes BR1-3 may be managed by an optimized edge routing is (OER) "Master" node, which may be connected to the border nodes by, e.g., point-to-point links or a local area network. These examples are merely representative. Those skilled in the art will understand that any number of routers, nodes, and exits may be used in the computer network and connected in a variety of ways, and that the view shown herein is for simplicity.

Data packets may be communicated by the AS and destination prefixes using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols (IGPs), such as conventional link-state or distance-vector protocols. In addition, data packets containing network topology information may be exchanged among ASes using "external" gateway protocols, such as the Border Gateway Protocol (BGP).

Figure 2:
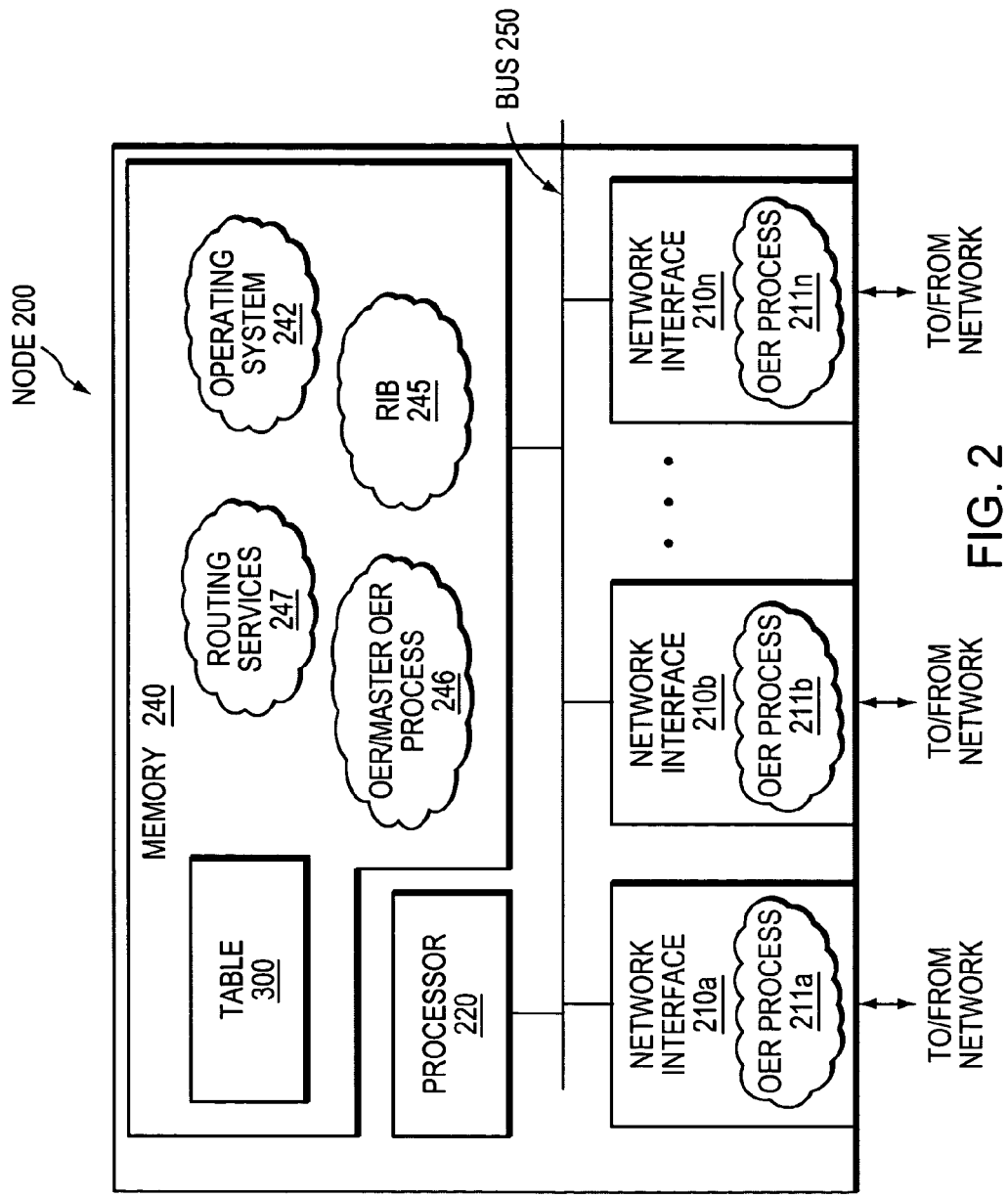
FIG. 2 is a schematic block diagram of an exemplary node that may be advantageously used with the present invention.

FIG. 2 is a schematic block diagram of an exemplary node 200 that may be advantageously used with the present invention, such as, e.g., a border node (e.g., an edge router) or a master node. The node comprises a plurality of network interfaces 210a-n (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as table 300. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include Routing Information Base (RIB) 245, OER/Master OER Process 246, and routing services 247. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as IGP or BGP, in order to compute best paths/routes for installation into the routing table (not shown).

According to the illustrative embodiment of the present invention, the OER/Master OER Process 246 is employed by an OER node (e.g., border routers BR1-3) and an OER Master node (e.g., an OER Master router), respectively. The Master OER process 246 executing on the OER Master node communicates with border routers BR1-3 to request, among other things, the monitoring of a set of address prefixes. The OER processes 246 executing on the border routers monitor traffic at the edge of the AS1 and respond with, inter alia, network statistics corresponding to the monitored prefixes. Illustratively, instances of the OER process 246 execute on the network interfaces 210 as OER processes 211a-n configured to measure various types of network statistics acquired from monitored traffic. These statistics are then forwarded from the OER processes 211a-n to the OER process 246. The statistics may correspond to various traffic measurements, such as round-trip delay times, data throughput (i.e., the amount of data transferred or received), packet loss, reachability, etc. In general, the OER processes (notably, 246 and/or 211a-n) may measure any arbitrary traffic metric, including conventional cost-based and distance-based metrics. Further, the OER Process 246 and/or 211a-n may calculate statistical averages, variances, medians, etc. of a collection of traffic measurements.

Techniques for learning address prefixes, and collecting traffic statistics (passively monitoring) are described in commonly-owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety. Also, techniques for actively probing (managing paths and targets of active probe packets) are described in commonly-owned copending U.S. patent application Ser. No. 11/113,629, entitled ACTIVE PROBE PATH MANAGEMENT, filed by Blair et al. on Apr. 25, 2005, and commonly-owned copending U.S. patent application Ser. No. 11/113,582, entitled ACTIVE PROBE TARGET MANAGEMENT, filed by Metzger et al. on Apr. 25, 2005, the contents of both of which are hereby incorporated in their entirety.

The statistics from the OER Process 246 and/or 211a-n are then processed at the Master node in accordance with the Master OER process 246. More specifically, the Master OER process 246 analyzes the statistics and determines whether the distribution of traffic entering and/or leaving the AS1 can be optimized, e.g., according to one or more policies, such as described herein. If so, the Master OER process may redistribute traffic routed through the border nodes by, e.g., associating new BGP local-preference values with selected traffic or statically changing the routing table contents of the border nodes. In that sense, the Master OER process selects optimal exit links (OELs) to various destination prefixes. Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes. Those skilled in the art will understand that while the OER Master node and OER node (e.g., a border router) are shown as separate nodes (e.g., in FIG. 1), the Master and OER node may be configured within the same node. For example, a single border router (e.g., a home office router) having multiple exits/paths may both monitor the quality of its exits and select the OEL itself.

The present invention is directed to a technique for managing route optimization for one or more groups of links in a computer network. According to the novel technique, each group or "subgroup" of links comprises one or more links, wherein the group may be configured based on various measures, such as, e.g., connectivity (physical or virtual), policies to be applied, per-prefix, per-application (e.g., Internet traffic or voice over IP, VoIP), geographic location, and/or quality-based (e.g., primary links and secondary/backup links). One or more policies may be defined for the groups of links (i.e., where these group policies are to be applied to the group as a whole), in addition to policies that may be defined for individual links and/or prefixes. Once the link groups are established, traffic over the groups of links (e.g., routes to reachable address prefixes) may be managed and optimized according to the group policies, such as in accordance with Optimized Edge Routing (OER) techniques.

In accordance with the present invention, the groups may be configured based on various measures, such as according to the specific arrangements of a particular system (e.g., as determined by a system administrator or dynamic programming). For example, one measure is connectivity, which may be either physical or virtual connectivity. Physical connectivity, for example, may be based on physical connections to one or more service providers (e.g., links to a service provider "A" may all belong to a group "A"), physical ports from particular network interfaces 210*a-n* (e.g., links originating from network interface 210*a* may all belong to a group "B"), etc. Virtual connectivity, on the other hand, may, for example, be based on VPN connections (e.g., each VPN belongs to a separate corresponding group), Multi-Topology Routing (MTR) topologies (e.g., expanding internal MTR to external links), etc.

An example connectivity situation where groups are helpful is a hub-and-spoke model (e.g., an Enterprise Class Teleworker, ECT, solution). For instance, a central enterprise hub may have fifty spokes to remote branches, and each spoke may comprise two or more links (e.g., multi-homed). In this case, whether physical or virtual, if only the spokes to a particular remote branch can reach that remote branch, there is no need to consider the other spokes (i.e., the other 98 or more links), which would otherwise create useless additional probing traffic and processing time. By creating groups based on connectivity, route management and optimization (described herein) may be limited to only those groups of links that can reach the destination. Other physical and/or virtual connections will be understood by those skilled in the art, and the examples described above are merely representative of different types of connectivity.

Geographic location is another measure that is related to physical connectivity, where, for example, certain links may be used to transmit traffic to one location (e.g., a corporate headquarters in location 1), while other links may be used to transmit traffic to another location (e.g., a corporate satellite office in location 2), etc. Configuring the groups on a per-prefix basis operates in much the same manner, where links used to reach certain prefixes are associated with a particular group, etc.

Groups may also be configured according to a per-application basis. For example, certain links may be better suited for different types of traffic than other links. One situation where this may be useful may be where a set of high cost, low latency links exist that are well suited for voice over IP (VoIP) traffic, and hence a corresponding group of VoIP links may be formed, as will be understood by those skilled in the art. In addition to the VoIP groups, then, a group of non-VoIP (e.g., data and/or Internet traffic) links may also be formed, although it may not be necessary.

Another similar example measure that may be used to configure groups is the set of policies to be applied to the groups (which are described in more detail below). VoIP traffic, for instance, may have different policies than data traffic, and groups may be established accordingly. Another policy-based condition may be the case where certain links have different capabilities (e.g., bandwidth) than other links. In this case, policies may be stricter for some links versus other links, and those links may benefit from being associated with a group that is different from the other links.

Still another useful basis for configuring groups (that is related to a policy-based configuration) is a quality-based arrangement. For instance, certain links may be designated as primary links (e.g., cheaper, faster, better, etc.), while other links are secondary/backup links (e.g., expensive, slower, etc.), as will be understood by those skilled in the art.

Notably, each of the above-mentioned measures that may be used to configure groups is meant to be an example, and is not meant to be limiting on the scope of the present invention in any way. For instance, the examples above may be combined in any fashion for any particular group, and may be used separately for separate groups within the same system. As those skilled in the art will understand, any group configuration that a system administrator would believe to provide beneficial results on route management and optimization falls within the scope and protection of the present invention. Notably, each link may be associated into more than one group. For instance, exit link 1 may be in a group used for VoIP traffic, as well as a group that is associated with a particular MTR topology.

Once the one or more groups are established, one or more policies may be defined for those groups, which are to be applied to each group as a whole. While these group policies are in addition to policies that may be defined for individual links and/or prefixes, the group policies are similar in design and function as the individual policies. Those skilled in the art will understand how various policies may be defined for a group, and the examples described herein are merely representative. For instance, a simple policy may be to route all VoIP traffic over a group containing exit links 1-3 whenever possible. Another policy may involve a quality-based decision process, such as routing all traffic over the two groups containing links 1-2 and 3-4, respectively (e.g., the "primary" groups), until all of the links in the primary groups fail (e.g., each link goes out-of-policy or the destination prefix becomes unreachable to all the links), then route traffic over the group containing links 5-6 (e.g., the "secondary/backup" group). A more complex example may include a "fall back" scenario, where if any one of the links in either of the primary groups fail, introduce the secondary group as a route option (e.g., by switching from the group with the failed link to the secondary group, or by simply including the secondary group's links in the routing decision). The same sort of policies may be applicable for a "back off" scenario, where if a certain group is becoming congested (e.g., has no "head room"), the policy may be defined to back off routing traffic over the primary groups and introduce the secondary group(s) to alleviate the congestion. In general, any type of policy may be defined for the groups, where a policy is broadly defined as a rule or rules to apply when making decisions, as will be understood by those skilled in the art.

Once the link groups and group policies are established, the traffic over the groups of links may be managed and optimized accordingly. In particular, routes to reachable address prefixes may be dynamically adjusted in accordance with the group policies, such as, e.g., by using OER techniques as described in detail above. For instance, instead of routing merely based upon individual link policies, the OER process 246 may now include the group policies in its policy-based decision-making process. (Those skilled in the art will understand that in various situations, conventional policy conflict resolution may be required.)

Optimization may be configured (e.g., as a policy) as intra-group optimization and inter-group optimization. Intra-group optimization limits the link selection to within a particular group. For example, assume that a group A has links 1-3. According to intra-group optimization, only links 1-3 will be compared and selected. Inter-group optimization, on the other hand, limits the selection to within a particular plurality of groups. Here, assuming again group A, further assume that groups B and C have links 4-5, and 6, respectively, and that inter-group optimization is used for groups A and B. In this case, to links 1-5 will be managed and optimized, while link 6 will not. As an example, group A-C may correspond to one of three different service providers. A system administrator may wish to utilize only the links going to the first two service providers (i.e., groups A and B), so inter-group optimization would be useful here. In the event the administrator wishes to utilize only the links to the first service provider, however, intra-group optimization (i.e., of group A) may be used.

Upon selecting a particular group (e.g., a group corresponding to VoIP traffic), the OER process 246 may then continue to select the best link (or links) from the particular group over which to route traffic, such as according to individual link polices. In this manner, group policies provide an additional layer of policy control over individual link policies. Notably, when subgroups are created as mentioned above, each level of subgroups/links is progressively subjected to the same policy-based decision making process until a final decision is reached. Moreover, in the case where the groups or subgroups of links correspond to a logical bonding/aggregation of links (e.g., EtherChannel, multipoint PPP, etc.), the OER process 246 may simply inform the routing service 247 controlling the aggregated links of the particular group selection, rather than select a single best link from the selected group. The routing service 247 may then perform the link selection and/or load-balancing according to methods known to those skilled in the art for bonded/aggregated links. As such, the present invention may be used to optimize and route traffic over a single link or multiple links accordingly.

It is also possible to use the present invention with combined performance characteristics and/or statistics of each group/subgroup for use with route optimization. For example, SLAs for particular service providers may combine the statistics of all traffic into the service provider's network, e.g., bandwidth used, in order to bill a client. Because of this, it may be advantageous to optimize traffic routed into this service provider's network based upon the combined statistics. Also, the same strategy applies to other types of bonded/aggregated links as mentioned above. For instance, given two groups of aggregated links, it may be more beneficial to compare the total cost of each group, rather than the cost of each individual link of the groups. One method describing a cost minimization scheme for combined links is described in above-incorporated U.S. patent application Ser. No. 11/356, 584, entitled ROUTE OPTIMIZATION OF SERVICES PROVIDED BY ONE OR MORE SERVICE PROVIDERS FOR COMBINED LINKS.

FIG. 3 is an exemplary table 300 that may be used in accordance with the present invention. Table 300 is illustratively stored in memory 240 and includes one or more entries 320, each comprising a plurality of fields for storing a group ID 305 having one or more links 310, and one or more policies/definitions 315 to be applied to the particular group. The table 300 is illustratively maintained and used by OER/Master OER process 246 for route optimization management of link groups in accordance with the invention. Those skilled in the art will understand that while a table is shown and described herein, other known data structures may be used in accordance with the present invention. In the example table 300, group IDs A-E have corresponding links as shown, configured based upon various measures as described herein. Policy definitions 315 may include such policies as groups defined for VoIP traffic, data traffic, backup groups, particular service providers, and others as described herein and as will be understood by those skilled in the art. Other group and link combinations, along with their respective policies may be defined, as will be understood by those skilled in the art, and the table 300 as shown is merely representative.

As a brief example, assume that OER process 246 optimizes the best exit link for VoIP traffic. OER process 246 first determines whether any group policies apply, in which case it determines that group A is to be used for VoIP traffic whenever possible. From there, OER process 246 may determine the best link(s) within group A (i.e., either 1, 2, or 5) over which to route VoIP traffic. Notably, as mentioned above, intra-group and inter-group optimization may be configured for the groups. For instance, in the table above, to maintain the property that VoIP traffic is routed over group A, intra-group optimization may be used, so only links 1, 2, and 5 are considered. Conversely, when applying policies based on service providers, a system administrator may wish to route traffic over service providers 2 or 3, but not 1. In this case, inter-group optimization between groups D and E results in links 3-6 being considered. Other instances of intra- and inter-group optimization will be understood by those skilled in the art, and those shown herein are merely representative.

Figure 4:
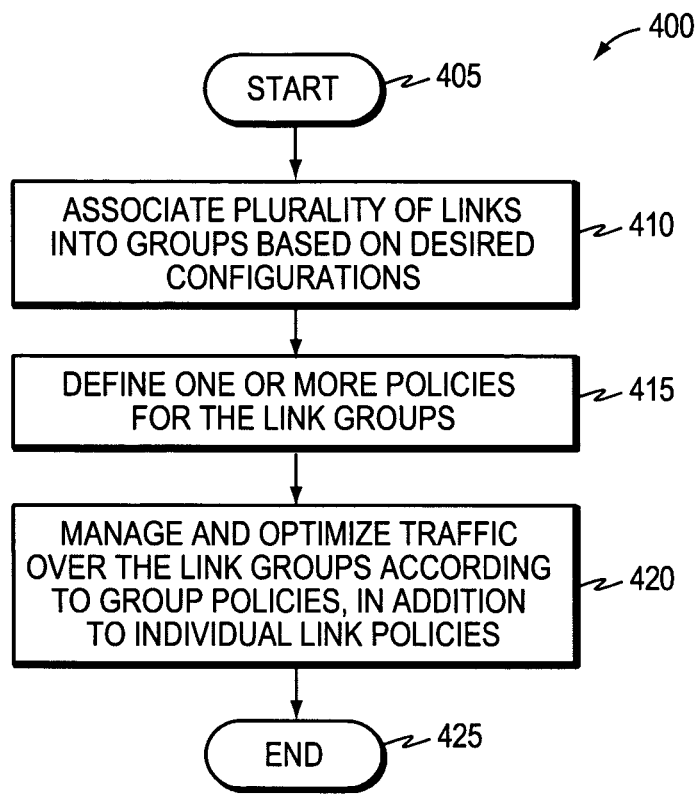
FIG. 4 is a flowchart illustrating a procedure for managing route optimization for groups of links in accordance with the present invention.

FIG. 4 is a flowchart illustrating a procedure for managing route optimization for groups of links in accordance with the present invention. The procedure 400 starts at step 405, and continues to step 410, where a plurality of links are associated into groups based on desired configurations, such as, e.g., by a system administrator with knowledge of the network. As described above, these configurations may be based upon, e.g., connectivity, policies to be applied, per-prefix, per-application, geographic location, and/or quality-based. Once the link groups are created, one or more policies are defined for the link groups in step 415 that are to be applied to the group as a whole. These group policies are in addition to policies that may be defined for individual links and/or prefixes, as will be understood by those skilled in the art. With the created groups and their defined policies, traffic over the link groups may be managed and optimized according to those policies as well as individual link policies in step 420 as described in detail above, such as, e.g., through OER techniques. The procedure ends at step 425.

Advantageously, the novel technique manages route optimization for groups of links in a computer network by treating each group as if it were a single unit having a single set of policies. As a result, the novel technique enhances the control of routes and the flow of traffic (i.e., link group policies) over conventional and cumbersome single-link techniques.

While there has been shown and described an illustrative embodiment that manages route optimization for groups of links in a computer network, it is to be understood that various other adaptations and modifications may be made within the spirit and scope of the present invention. For example, the invention has been shown and described herein for use with OER technologies and practices. However, the invention in its broader sense is not so limited, and may, in fact, be used with any other route optimization techniques available to those skilled in the art. Also, while the above description is directed to grouping links for route management and optimization, the techniques described herein may be used to manage and optimize groups of any type of policy-based options, such as a plurality of data/file servers, computers, applications, processes, etc., as will be understood by those skilled in the art. Notably, groups and group policies may be configured and/or updated (such as in response to changes in the network) either manually, e.g., by a system administrator, or dynamically, e.g., by various software processes described herein.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for managing route optimization for a plurality of links in a computer network, the method comprising:
    associating each of the plurality of links into one or more of a plurality of groups, each of the plurality of groups having two or more links;
    defining one or more group policies for each of the plurality of groups, wherein the group policies are to be applied to a respective group as a whole, wherein at least one group policy includes a protocol that determines a selection of a particular group of links over which to route traffic for a particular reachable address prefix; and
    adjusting routes to reachable address prefixes over the plurality of links according to the one or more group policies, by selecting the particular group of links over which to route traffic for the particular reachable address prefix based on the one or more of the group policies and combining at least one of link performance characteristics or link traffic statistics for links of the particular group of links for use in adjusting routes to reachable address prefixes over the plurality of links.

2. The method as in claim 1, further comprising:
    configuring the plurality of groups based on measures selected from the group consisting of: connectivity; policies to be applied; per-prefix; per-application; geographic location; and quality-based.

3. The method as in claim 1, further comprising:
    adjusting routes to reachable address prefixes over the plurality of links according to the group policies in addition to policies defined for individual links and prefixes.

4. The method as in claim 1, further comprising:
    adjusting routes to reachable address prefixes in accordance with Optimized Edge Routing (OER) techniques.

5. The method as in claim 1, further comprising:
    associating at least some of the plurality of links into one or more subgroups of the groups, each subgroup having one or more links.

6. The method as in claim 1, further comprising:
    associating at least one of the plurality of links into more than one of the groups.

7. The method as in claim 1, further comprising:
    performing at least one of either intra-group and inter-group management and optimization for the groups.

8. A node for managing route optimization for a plurality of links in a computer network, the node comprising:
    one or more network interfaces;
    a processor coupled to the one or more network interfaces and adapted to execute software processes; and
    a memory adapted to store an optimized edge routing (OER) process executable by the processor, the OER process configured to:
        i) associate each of the plurality of links into one or more of a plurality of groups, each group having two or more links,
        ii) define one or more group policies for each of the groups, wherein the group policies are to be applied to the respective group as a whole, wherein at least one group policy includes a protocol that determines a selection of a particular group of links over which to route traffic for a particular reachable address prefix, and
        iii) adjust routes to reachable address prefixes over the plurality of links according to the one or more group policies by selecting the particular group of the links over which to route particular traffic to the reachable address prefix based on the one or more of the group policies of the groups and combining at least one of link performance characteristics or link traffic statistics for links of the particular group of links.

9. The node as in claim 8, wherein the OER process is further configured to:
    configure the plurality of groups based on measures selected from the group consisting of: connectivity; policies to be applied; per-prefix; per-application; geographic location; and quality-based.

10. The node as in claim 8, wherein the OER process is further configured to:
    manage and optimize the traffic to reachable address prefixes over the plurality of links according to the group policies in addition to policies defined for individual links and prefixes.

11. The node as in claim 8, wherein the OER process is further configured to:
    associate at least some of the plurality of links into one or more subgroups of the groups, each subgroup having one or more links.

12. The node as in claim 8, wherein the OER process is further configured to:
    associate at least one of the plurality of links into more than one of the groups.

13. The node as in claim 8, wherein the OER process is further configured to:
    perform at least one of either intra-group and inter-group management and optimization for the groups.

14. An apparatus for managing route optimization for a plurality of links in a computer network, the apparatus comprising:
    a processor; and
    a memory having stored therein instructions which, when executed by the processor, cause the processor to perform operations comprising:
        associating each of the plurality of links into one or more of a plurality of groups, each group having two or more links;
        defining one or more group policies for each of the groups, wherein the group policies are to be applied to the respective group as a whole, wherein at least one group policy includes a protocol that determines a selection of a particular group of links over which to route traffic for a particular reachable address prefix; and
        adjusting routes to reachable address prefixes over the plurality of links according to the one or more group policies by selecting the particular group of the links over which to route particular traffic for the particular reachable address prefix based on the one or more of the group policies and a combination of at least one of link performance characteristics or link traffic statistics for links of the particular group of links for use in adjusting routes to reachable address prefixes over the plurality of links.

15. A non-transitory computer readable medium containing executable program instructions for managing route optimization for a plurality of links in a computer network, the executable program instructions comprising program instructions for:

associating each of the plurality of links into one or more of a plurality of groups, each group having two or more links;

defining one or more group policies for each of the groups, wherein the group policies are to be applied to the respective group as a whole, wherein at least one group policy includes a protocol that determines a selection of a particular group of links over which to route traffic for a particular reachable address prefix; and adjusting routes to reachable address prefixes over the plurality of links according to the one or more group policies by combining at least one of link performance characteristics or link traffic statistics for links of the particular group of links for use in adjusting routes to reachable address prefixes over the plurality of links and selecting the particular group of the links over which to route particular traffic for the particular reachable address prefix based on the one or more of the group policies.

16. The apparatus as in claim 14, further comprising:
configuring the plurality of groups based on measures selected from the
group consisting of: connectivity; policies to be applied; per-prefix; per-application; geographic location; and quality-based.

17. The apparatus as in claim 14, further comprising:
adjusting routes to reachable address prefixes over the plurality of links
according to the group policies in addition to policies defined for individual links and prefixes.

18. The apparatus as in claim 14, further comprising:
managing and optimizing the traffic in accordance with Optimized Edge Routing (OER) techniques.

19. A method comprising:
associating each of a plurality of links in a computer network into one or more of a plurality of groups of links, each group of links including two or more links;
combining at least one of link performance characteristics or link traffic statistics for links of the groups of links for use in adjusting routes to reachable address prefixes over the plurality of links;
defining a group policy applicable to one or more of the groups of links, wherein the group policy applies to each of the one or more groups of links as a whole, wherein at least one group policy includes a protocol that determines a selection of a particular group of links over which to route traffic for a particular reachable address prefix;
defining an individual link policy applicable to one or more links of the plurality of links, wherein the individual link policy applies to each of the one or more links individually;
selecting a particular group of links from the plurality of groups of links over which to route traffic for the particular reachable address prefix based on the group policy; and
in response to selecting a particular group of links, selecting an individual link from the selected particular group of links over which to route traffic for the particular reachable address prefix based on the individual link policy.

20. The method of claim 19 wherein the plurality of groups of links are created based on connectivity to one or more destinations.

21. The method of claim 19, further comprising:
associating at least some of the particular group of links into one or more subgroups of links, each subgroup having two or more links; and
selecting a particular subgroup of links.

22. The method as in claim 19, further comprising:
associating at least one of the plurality of links into more than one of the groups of links.

23. An apparatus comprising:
one or more network interfaces;
a processor coupled to the one or more network interfaces and configured to execute software processes; and
a memory configured to store an optimized edge routing (OER) process executable by the processor, the OER process, when executed, operable to:
associate each of a plurality of links into one or more of a plurality of groups of links, each group of links including two or more links,
combine at least one of link performance characteristics or link traffic statistics for links of the plurality of links for use in adjusting routes to reachable address prefixes over the plurality of links,
define a group policy applicable to one or more of the groups of links, wherein the group policy applies to each of the one or more groups of links as a whole,
define an individual link policy applicable to one or more links of the plurality of links, wherein the individual link policy applies to each of the one or more links individually, wherein at least one group policy includes a protocol that determines a selection of a particular group of links over which to route traffic for a particular reachable address prefix,
select the particular group of links from the plurality of groups of links over which to route traffic based on the group policy, and
select an individual link from the selected particular group of links over which to route traffic based on the individual link policy.

24. The apparatus of claim 23 wherein the plurality of groups of links are based on connectivity to one or more destinations.

25. The apparatus of claim 23, wherein the OER process, when executed, is further operable to:
associate at least some of the particular group of links into one or more subgroups of links, each subgroup having two or more links, and select a particular subgroup of links.

26. The apparatus of claim 23, wherein at least one of the plurality of links is a member of more than one of the groups of links.

* * * * *